(12) United States Patent
Lecocke et al.

(10) Patent No.: US 11,343,775 B1
(45) Date of Patent: May 24, 2022

(54) METHOD AND SYSTEM FOR MANAGING POWER CONSUMPTION OF A MOBILE DEVICE IN AN EMERGENCY

(71) Applicant: UIPCO, LLC, San Antonio, TX (US)

(72) Inventors: Meredith Beveridge Lecocke, San Antonio, TX (US); Michael J. Maciolek, Boerne, TX (US); Robert Wiseman Simpson, Fair Oaks Ranch, TX (US); Daniel Christopher Bitsis, Jr., San Antonio, TX (US); Bobby Lawrence Mohs, San Antonio, TX (US); Manfred Amann, San Antonio, TX (US); Emily Margaret Gray, San Antonio, TX (US); Donnette Moncrief Brown, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/697,990

(22) Filed: Nov. 27, 2019

Related U.S. Application Data

(60) Provisional application No. 62/772,734, filed on Nov. 29, 2018.

(51) Int. Cl.
*H04W 4/90* (2018.01)
*H04W 52/02* (2009.01)
*H04W 4/021* (2018.01)

(52) U.S. Cl.
CPC ......... *H04W 52/028* (2013.01); *H04W 4/021* (2013.01); *H04W 4/90* (2018.02); *H04W 52/0216* (2013.01); *H04W 52/0267* (2013.01)

(58) Field of Classification Search
CPC ..... H04W 4/021; H04W 4/023; H04W 4/025; H04W 4/029; H04W 4/90; H04W 52/0251; H04W 52/0261; H04W 52/0264; H04W 52/0274; H04W 52/0296; H04W 52/0267; H04W 52/277
See application file for complete search history.

(56) References Cited

U.S. PATENT DOCUMENTS

| | | | | |
|---|---|---|---|---|
| 6,721,580 | B1* | 4/2004 | Moon | H04W 52/0261 |
| | | | | 455/574 |
| 8,270,938 | B2* | 9/2012 | Flippo | G01S 19/34 |
| | | | | 455/404.2 |
| 8,489,111 | B2* | 7/2013 | Chawla | G01S 19/34 |
| | | | | 455/456.1 |
| 10,909,830 | B1* | 2/2021 | Stapleford | G08B 21/023 |

(Continued)

*Primary Examiner* — Jean A Gelin
(74) *Attorney, Agent, or Firm* — Plumsea Law Group, LLC

(57) ABSTRACT

A system and method for managing power consumption in a mobile device during an emergency is disclosed. The system includes an emergency management system running on a mobile device. The emergency management system can automatically enable one or more power saving modes when an emergency alert is received by the mobile device. The power saving modes may include a reduced communication mode. In the reduced communication mode the mobile device only communicates for brief periods at recurring intervals. The power saving modes may also include a simplified display mode. The simplified display mode may display content on the display of a mobile device in a way that reduces power consumption.

20 Claims, 9 Drawing Sheets

(56) References Cited

U.S. PATENT DOCUMENTS

| | | | |
|---|---|---|---|
| 2003/0125010 A1* | 7/2003 | Jung | H04L 69/329 455/404.1 |
| 2006/0153114 A1* | 7/2006 | Tanaka | H04W 52/0216 370/311 |
| 2006/0259803 A1* | 11/2006 | Edwards | G06F 1/325 713/320 |
| 2007/0025195 A1* | 2/2007 | Oh | G06F 1/3221 369/30.03 |
| 2008/0242371 A1* | 10/2008 | Chiba | H04W 52/0251 455/574 |
| 2009/0201271 A1* | 8/2009 | Michiyasu | G09G 3/3611 345/204 |
| 2010/0004035 A1* | 1/2010 | Ray | H04W 76/50 455/572 |
| 2010/0138202 A1* | 6/2010 | Mallison | E21B 43/00 703/10 |
| 2012/0028600 A1* | 2/2012 | Vallaire | G08B 27/00 455/404.2 |
| 2012/0080944 A1* | 4/2012 | Recker | H05B 45/20 307/25 |
| 2012/0115430 A1* | 5/2012 | Hawkes | H04W 76/50 455/404.1 |
| 2013/0109343 A1* | 5/2013 | Cheng | H04W 4/90 455/404.2 |
| 2013/0176127 A1* | 7/2013 | Junqua | G06Q 10/1093 340/573.1 |
| 2013/0303105 A1* | 11/2013 | Jo | H04N 7/185 455/404.1 |
| 2015/0050922 A1* | 2/2015 | Ramalingam | H04W 4/021 455/418 |
| 2015/0208971 A1* | 7/2015 | Hayter | A61B 5/14546 600/347 |
| 2015/0243150 A1* | 8/2015 | Kang | G08B 21/10 340/601 |
| 2015/0334687 A1* | 11/2015 | Ventulett | H04W 52/0212 455/419 |
| 2016/0087736 A1* | 3/2016 | Murakami | H04H 20/59 370/312 |
| 2016/0165537 A1* | 6/2016 | Suzuki | H04W 52/0225 455/574 |
| 2017/0153694 A1* | 6/2017 | Baldwin | G06F 1/3212 |
| 2017/0180963 A1* | 6/2017 | Cavendish | H04W 4/90 |
| 2018/0354458 A1* | 12/2018 | Kinugawa | G07C 9/22 |
| 2019/0020991 A1* | 1/2019 | Hamilton | H04W 4/023 |
| 2019/0067999 A1* | 2/2019 | Yu | H02J 7/025 |
| 2020/0252780 A1* | 8/2020 | McClendon, IV | G06F 21/44 |

* cited by examiner

METHOD AND SYSTEM FOR MANAGING POWER CONSUMPTION OF A MOBILE DEVICE IN AN EMERGENCY

CROSS-REFERENCE TO RELATED APPLICATIONS

This application claims the benefit of Provisional Patent Application No. 62/772,734, filed Nov. 29, 2018, and title "Method and System for Managing Power Consumption of a Mobile Device in an Emergency", which is incorporated by reference herein in its entirety.

TECHNICAL FIELD

The present disclosure generally relates to methods and systems for managing mobile devices, and in particular, to managing mobile devices in emergencies.

BACKGROUND

During and after disasters, such as hurricanes, tornados, and floods, as well as other kinds of emergencies, there may be limited access to power sources for charging mobile devices, such as cell phones and tablets. Because the mobile devices may be critical for communication and requesting help, it is important that the power consumption of these mobile devices be limited throughout the duration of any emergency.

There is a need in the art for a system and method that addresses the shortcomings discussed above.

SUMMARY

In one aspect, a method of managing the power consumption of a mobile device in an emergency includes receiving an emergency alert corresponding to the emergency, the emergency alert including information about a geographic area associated with the emergency. The method also includes receiving location information corresponding to a location of the mobile device and automatically enabling an emergency power saving mode when the mobile device is located in the geographic area.

In another aspect, a method of managing the power consumption of a mobile device in an emergency, where the mobile device includes a communication component, includes retrieving a predetermined period of time, turning off the communication component, turning the communication component on after the predetermined period of time has passed in order to receive data, and turning off the communication component after receiving the data.

In another aspect, a method of managing the power consumption of a mobile device in an emergency, the mobile device including a display, includes receiving an emergency alert corresponding to the emergency, retrieving display data, extracting text from the display data, displaying a black background on the display, and displaying the extracted text over the black background on the display.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide systems and methods for managing power consumption in a mobile device during an emergency. As used herein, the term "emergency" may refer to various kinds of events that may require immediate action, including assistance or relief. Emergencies can include disasters, such as hurricanes, tornados, floods, fires, severe storms, and earthquakes. Emergencies can also include various kinds of man-made disasters.

The method includes receiving an emergency alert on a mobile device and automatically enabling a power saving mode on the mobile device in response to the emergency alert. By automatically switching to a power saving mode in response to an emergency alert, the system may ensure that power consumption is reduced immediately in the event of an emergency, thereby maximizing the amount of energy saved while the emergency is ongoing. The embodiments include a reduced communication mode that may automatically shut off communication components (such as cellular and/or Wi-Fi) and only enable communication during periodic, and brief, intervals. This helps reduce power consumption associated with the continuous transmission, reception and processing of data that occurs during normal operation of the mobile device. In some cases, only critical data may be communicated to ensure data can be exchanged within relatively short communication periods.

The embodiments also include a simplified display mode that automatically displays content in a simplified format. By presenting content in a simplified format, the system and method may reduce the power consumed by the display itself and any associated processes required to display information.

Figure 1:
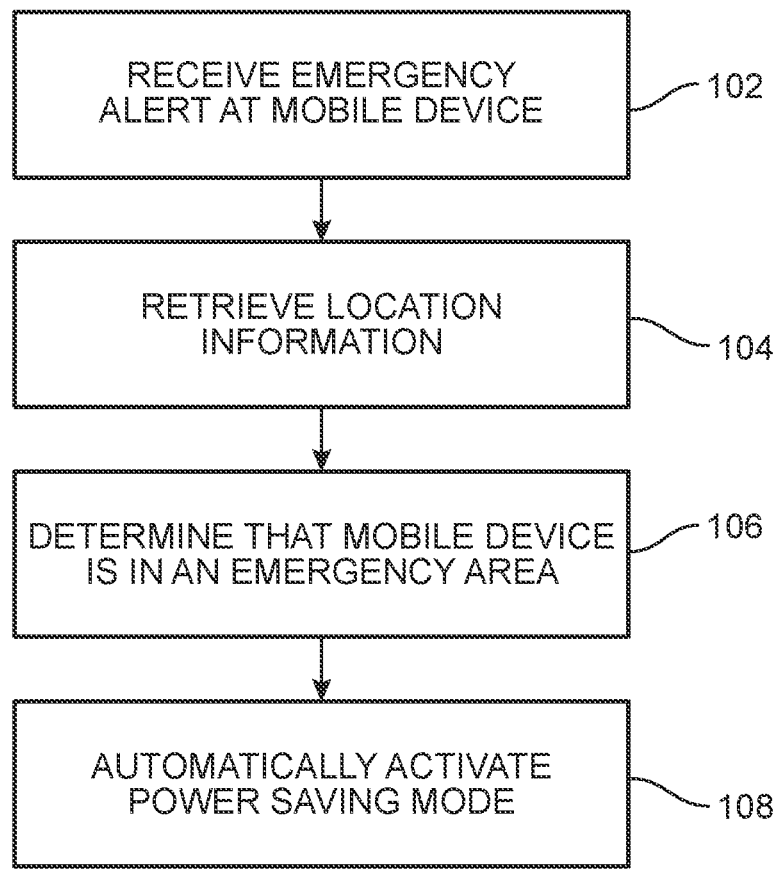
FIG. 1 is a schematic view of a process for automatically activating power saving modes on a mobile device in response to an emergency alert, according to an embodiment.

FIG. 1 is a schematic view of a process for managing power consumption in a mobile device during an emergency. In the present embodiment, one or more of the steps in this process may be performed by an emergency management system associated with a mobile device. An emergency management system could comprise a software application, one or more hardware components, or a combination of software and hardware.

In step 102, an emergency management system associated with a mobile device may receive an emergency alert. As used herein, an emergency alert may comprise any message or data that includes information about an emergency. As an example, an emergency alert could be an alert from the Wireless Emergency Alerts (WEA) system. The WEA system is a public safety system that allows users of mobile devices to receive geographically-targeted text messages. These messages alert the users to imminent threats to safety in their area. However, in some embodiments, an emergency management system could be configured to receive other kinds of emergency alerts. Emergency alerts can include information about the type of emergency/threat, instructions (such as evacuation instructions), and/or information about the specific geographic areas where the emergency is occurring. As used herein, the term "emergency areas" refers to any geographic areas associated with an emergency. Emergency areas could be streets, towns, counties, states, or given by any other geographic boundaries. In some cases, emergency areas could be defined by ranges of GPS coordinates.

Next, in step 104, the emergency management system may retrieve location information for the mobile device. As used herein, the term "location information" refers to any information that can be used in determining a location of a mobile device. Location information could include, but is not limited to, global navigation satellite system (GNSS) information, global positioning system (GPS) information, Wi-Fi positioning system (WPS) or any other kind of location information.

In step 106, the emergency management system may determine if the mobile device (and the user) is located in a geographic area associated with the emergency alert. In some embodiments, this determination includes using both information associated with the emergency alert received in step 102 and the location information retrieved in step 104. Specifically, the emergency management system may determine if the mobile device is currently located in any geographic regions indicated by the emergency alert. Alternatively, in other embodiments, the emergency management system may not check the location information and may operate under the assumption that the mobile device is within an emergency area whenever an emergency alert is received.

In step 108, the emergency management system may automatically activate one or more power saving modes as described in further detail below. These power saving modes may be enabled to reduce power consumption by the mobile device. Specifically, the power saving features may limit power consumption to activities that are critical for responding to the emergency and/or for getting the user out of the emergency areas. These may include location services and various kinds of critical communications. In some embodiments, after automatically activating a power savings mode, the emergency management system may send a notification to the user (via a system notification, text or email) to inform the user that the power savings mode has been enabled.

It may be appreciated that in step 108, the emergency management system may enable a power saving modes automatically. Specifically, this is performed without prompting a user of the mobile device to manually activate a power saving mode. By automatically enabling power savings in response to an emergency alert, power consumption can be reduced immediately, without the need to wait for a user to notice an emergency alert and manually enable a power saving mode.

Figure 2:
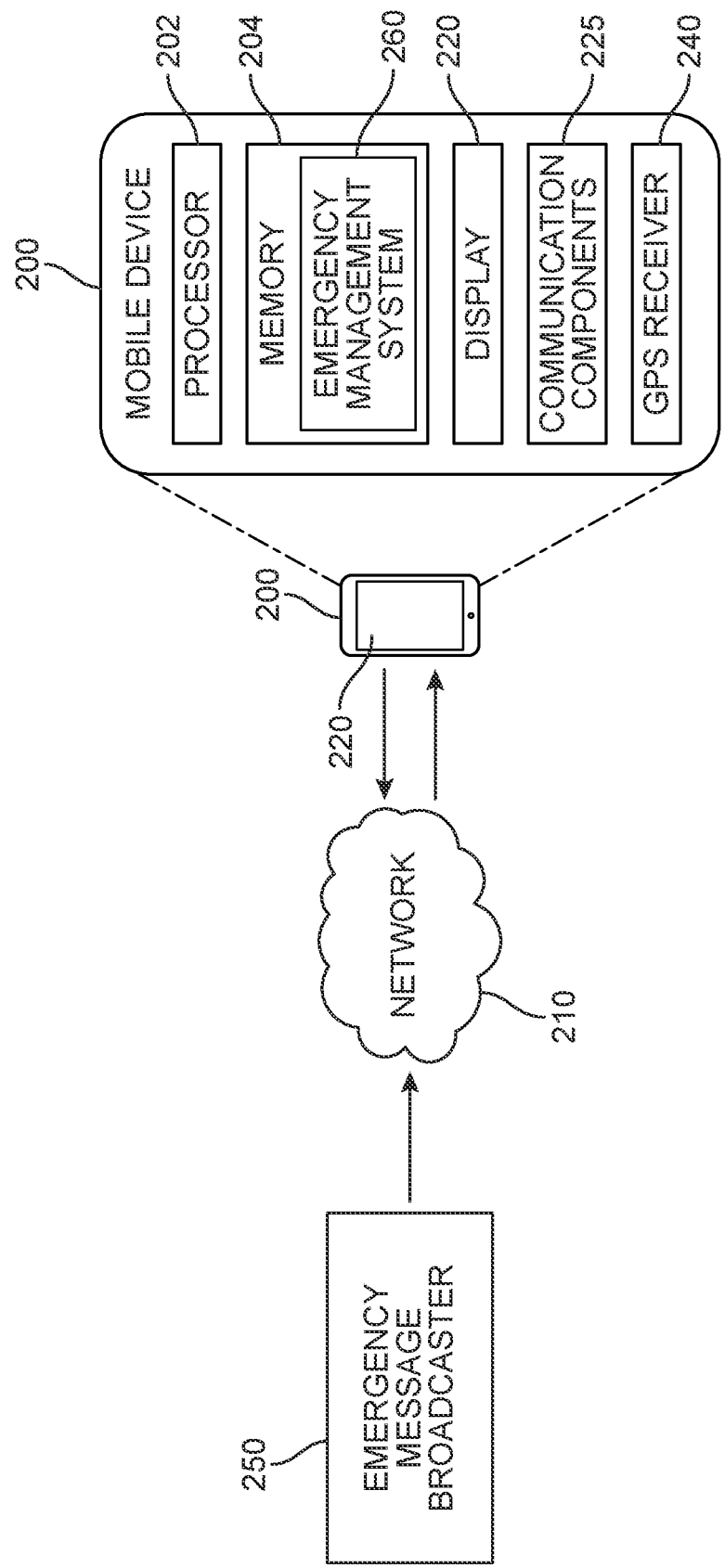
FIG. 2 is a schematic view of a system for performing the process of FIG. 1, according to an embodiment.

FIG. 2 is a schematic view of a mobile device 200. Exemplary mobile devices include, but are not limited to: cellular phones, smart phones, tablet computers, notebook computers, and e-book readers. Mobile device 200 may comprise a processor 202 and memory 204 for storing information, including software information and/or data. Memory 204 may include any type of storage, including Random Access Memory (RAM), micro-SD memory and Solid State Drives (SSD).

Mobile device 200 may also include various hardware components. For example, mobile device 200 may include display 220. In some embodiments, display 220 could be a touch-screen display that provides touch-based input.

Figure 3:
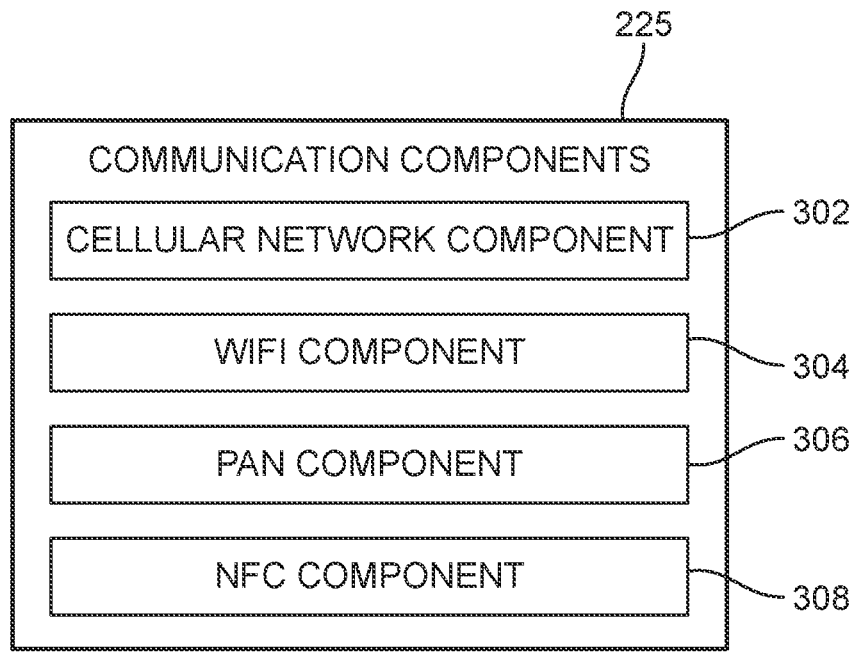
FIG. 3 is a schematic view of multiple different communication components, according to an embodiment.

Mobile device 200 may also include various communication components 225 configured to facilitate communication between mobile device 200 and other devices or computing systems over various kinds of networks. A set of exemplary communication components are depicted schematically in FIG. 3. These may include a cellular network component 302, a Wi-Fi component 304, a Personal Area Network (PAN) component 306 (for example, a Bluetooth radio), and a Near Field Communication (NFC) component 308. One or more of these components may function as radios within mobile device 200 for transmitting and receiving information in a specific radio band. In some embodiments, one or more of these components could be stand-alone hardware elements disposed in mobile device 200. In other embodiments, one or more of these components may be integrated components within a System on a Chip (SoC).

Cellular network component 302 may comprise any hardware capable of communicating with other nodes in a cellular network. The components may be configured to communicate using one or more known cellular technologies such as Global System for Mobile Communications (GSM) and Code-Division Multiple Access (CDMA). In some cases, cellular network component 302 may be incorporated as part of an SoC within mobile device 200.

Wi-Fi component 304 may comprise any hardware capable of communicating with nodes in a wireless network using the IEEE 802.11 standards. In some cases, Wi-Fi component 304 may comprise a wireless network interface controller (WNIC). In some cases, Wi-Fi component 304 may be incorporated as part of an SoC within mobile device 200.

PAN component 306 may comprise any hardware capable of communicating with nodes in a personal area network. PAN component 306 may be configured for specific protocols such as Bluetooth. In some embodiments, PAN component 306 could be a Bluetooth communication component that is capable of communicating with various Bluetooth enabled devices (such as watches, fitness trackers, automobile devices, portable speakers and other Bluetooth enabled devices). Because a mobile device may continuously scan for various Bluetooth devices, the ability to selectively disable a Bluetooth communication component (or other PAN component) can help reduce unnecessary power consumption in an emergency. In some cases, PAN component 306 may be incorporated as part of an SoC within mobile device 200. Moreover, in some cases, a single component can be operated for communicating over both Wi-Fi and personal area networks.

NFC component 308 may comprise any hardware capable of communicating with another electronic device using any known near-field communication standards. In some cases, NFC component 308 may be incorporated as part of an SoC within mobile device 200.

Mobile device 200 may include a hardware component for receiving any kind of global navigation satellite system (GNSS) information. As seen in FIG. 2, in one embodiment, mobile device 200 may include global positioning system (GPS) receiver 240. In some cases, GPS receiver 240 may be incorporated as part of an SoC within mobile device 200.

Mobile device 200 may send and receive information over one or more networks. As an example, mobile device 200 is indicated as communicating over a network 210 in FIG. 2. In some embodiments, network 210 may be a wide area network ("WAN"), e.g., the Internet. In other embodiments, network 210 may be a local area network ("LAN"). For example, in a more remote location far from a metropolitan area, the Internet may not be available. In yet other embodiments, network 210 may be a combination of a WAN and a LAN. Depending on the type of network, a suitable communications component may be used.

Mobile device 200 may communicate with an emergency message broadcaster 250. In some embodiments, mobile device 200 receives emergency alerts from emergency message broadcaster 250. In some cases, the emergency alert could be sent over the internet. In other cases, the emergency alert could be sent through a wireless wide area network used by a cellular provider associated with mobile device 200.

The exemplary system can include an emergency management system 260 stored within memory 204. Emergency management system 260 may include any software, processes or services used in managing the power use of mobile device 200. In some embodiments, emergency management system 260 may communicate with, and/or control, other hardware components, such as display 220, cellular network component 302, Wi-Fi component 304, PAN component 306, NFC component 308 and GPS receiver 240.

Figure 4:
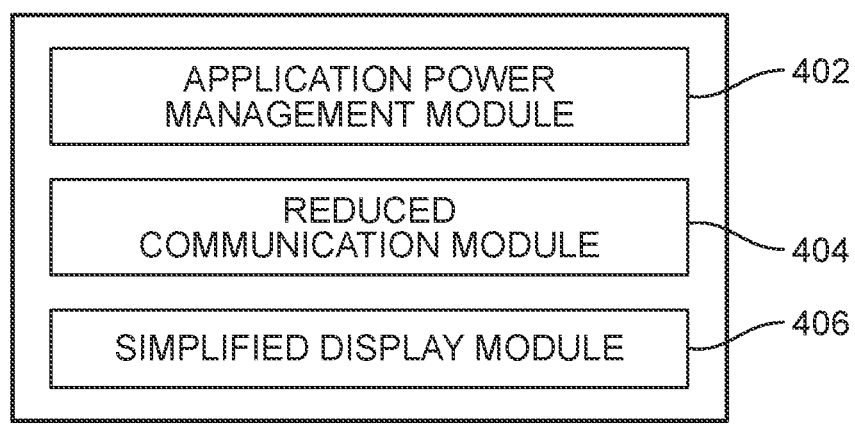
FIG. 4 is a schematic view of three power saving modules, according to an embodiment.

FIG. 4 is a schematic view of several different power management modules that may comprise emergency management system 260. Each power management module may comprise one or more software modules, and/or hardware components, that facilitate particular activities intended to reduce power consumption (or the rate of energy use) in a mobile device. These may include an application power management module 402, a reduced communication module 404 and a simplified display module 406.

Application power management module 402 may include software for managing the use of various software applications on the mobile device. In some embodiments, this module may limit any automatic updating of applications. In some embodiments, this module may reduce the amount of time that elapses before the display is shut off. In some embodiments, this module may limit the computational resources available to applications running in the background.

Application power management module 402 may be associated with a "low power application mode," or "low power mode" that may be enabled or disabled within emergency management system 260. In some embodiments, this mode could be separately enabled/disabled by a user of mobile device 200. For example, some embodiments could include a "low power mode" setting that could be switched on or off by a user.

Reduced communication module 404 may include software and hardware for limiting one or more modes of communication to save power. For example, reduced communication module 404 may be configured to limit or turn off any communications via one or more communication components 225. These include cellular network component 302, Wi-Fi component 304, PAN component 306 and NFC component 308. In some cases, transmission and receiving for each of these components could be selectively disabled. That is, components could be configured to send but not receive data, or to receive but not send data. As discussed in further detail below, in some embodiments these components could be shut off and re-enabled for brief intervals to save power while allowing for regular communications.

Reduced communication module 404 may be associated with an "reduced communication power mode," or simply "reduced communication mode" that may be enabled or disabled within emergency management system 260. In some embodiments, this mode could be separately enabled/disabled by a user of mobile device 200. For example, some embodiments could include a "reduced communication mode" setting that could be switched on or off by a user.

Simplified display module 406 may include software and hardware for limiting the power used by a display of a mobile device (for example, display 220 of mobile device 200). As described in further detail below, simplified display module 406 may transform the way information is presented on a display so as to minimize power consumption by the display and/or other components of the mobile device.

Simplified display module 406 may be associated with a "simplified display power mode," or simply "simplified display mode" that may be enabled or disabled within emergency management system 260. In some embodiments, this mode could be separately enabled/disabled by a user of mobile device 200. For example, some embodiments could include a "simplified display mode" setting that could be switched on or off by a user.

Figure 5:
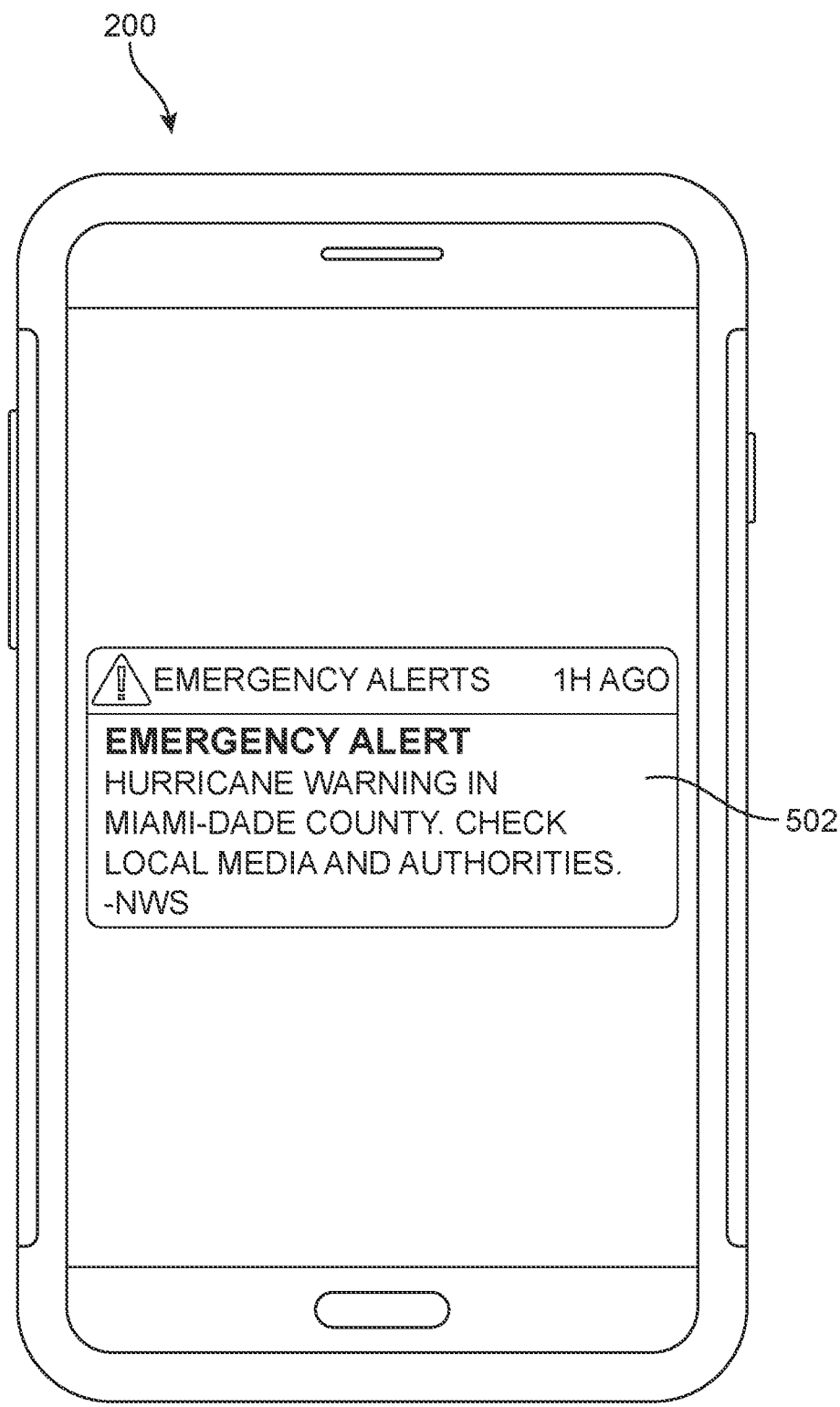
FIG. 5 is a schematic view of an emergency alert received at a mobile device, according to an embodiment.

FIG. 5 is a schematic view of a mobile device displaying an emergency alert that may be received at a mobile device. Referring to FIG. 5, mobile device 200 receives and displays an emergency alert 502. Emergency alert 502 includes information about the type of emergency ("Hurricane Warning") and geographic areas affected by the emergency ("Miami-Dade County"). The alert also provides instructions for the user ("Check local media and authorities").

As previously discussed and shown in FIG. 1, upon receiving an emergency alert, an emergency management system (such as emergency management system 260) can compare a current location of the mobile device (and user) with the emergency areas mentioned in the emergency alert. If the mobile device (and user) are in the affected areas, the emergency management system may automatically enable one or more of the power modes described above. In some embodiments, the emergency management system could enable any combination of these power management modes.

Figure 6:
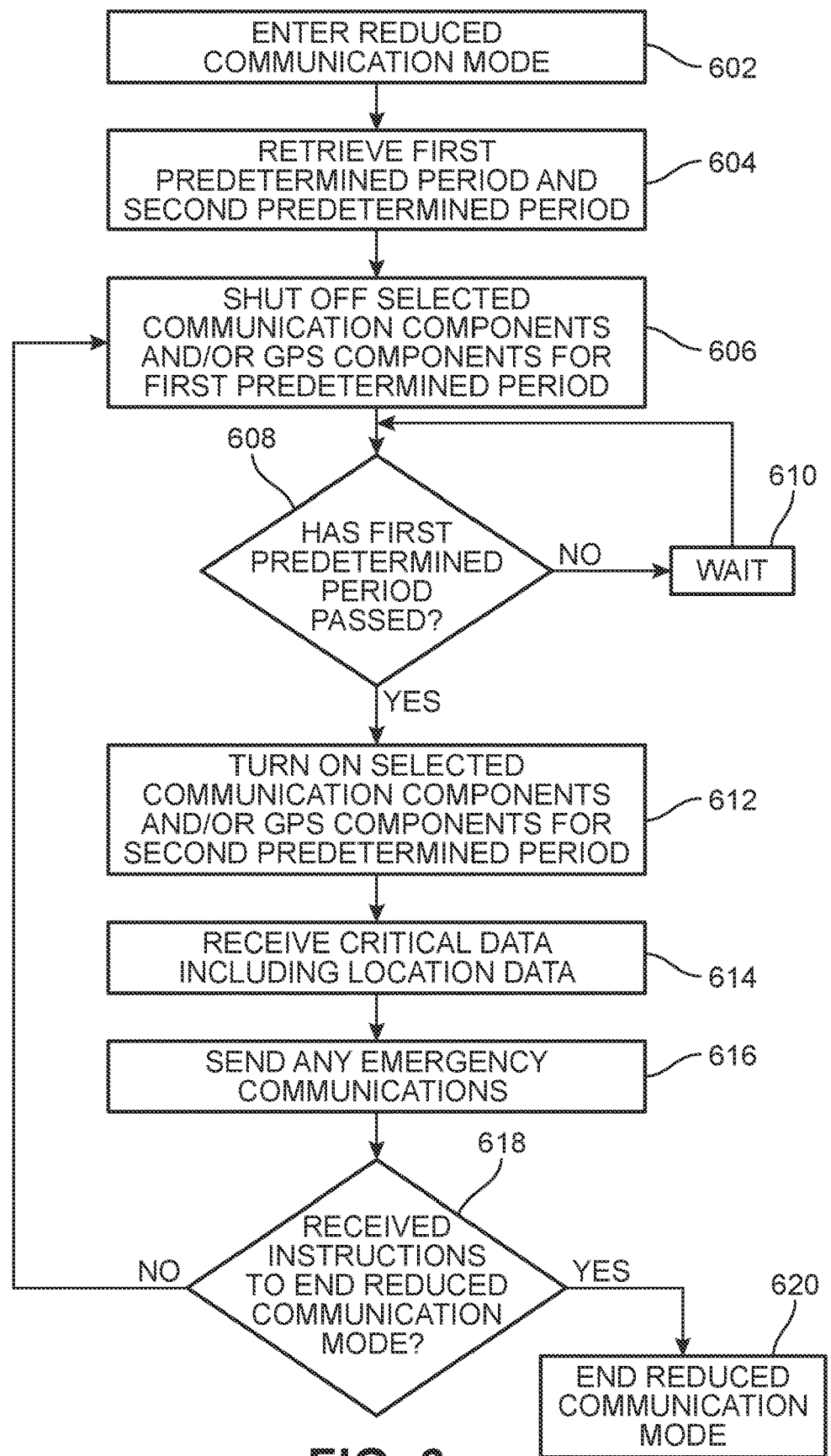
FIG. 6 is a schematic view of a process for automatically limiting the time that communication components are active and using power, according to an embodiment.

FIG. 6 is a schematic view of a process for switching communication components on and off to save power as part of a reduced communication mode. It may be appreciated that while the process depicted in FIG. 6 describes switching a single communication component on and off, a similar process may be used to switch any number of communication components on and off simultaneously. For clarity, the following process is described as being performed by emergency communication system 260, though in other embodiments some steps could be performed by other systems of a mobile device.

In step 602, the emergency communication system 260 may put the mobile device in (that is, enable) a reduced communication mode. As described above, this step may be performed automatically, without user intervention. In some cases, a user may be alerted when the reduced communication mode is enabled so they understand information is not being transmitted and received continuously.

Figure 7:
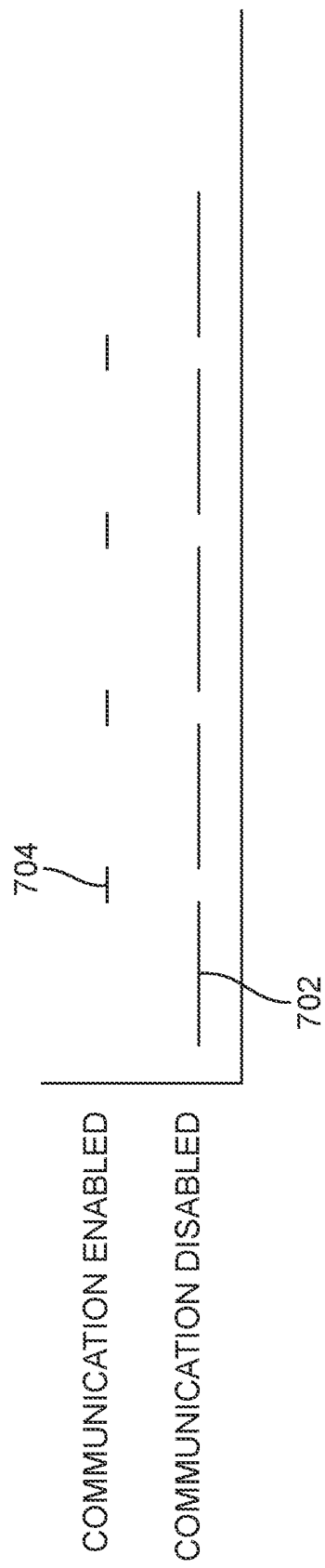
FIG. 7 is a schematic view of periods of time in which communication is alternately enabled and disabled, according to an embodiment.

Next, in step 604, emergency communication system 260 may retrieve a first predetermined period and a second predetermined period. The first predetermined period may correspond to a "switched off period" when the communication module is switched off or inactive. The second period may correspond to a "switched on period" when the communication module is switched on and able to actively send and/or receive information. In the exemplary embodiment, the second predetermined period is substantially less than the first predetermined period so that communication occurs in relatively short bursts between relatively longer periods of inactivity. The relationship of the first predetermined period and the second predetermined period is depicted schematically in FIG. 7. Referring to FIG. 7, during a first period 702 communication is disabled. Then, during a substantially shorter second period 704, communication is enabled. Once the second period 704 is over, communication is disabled again for the first period of time. This pattern may repeat as long as the device remains in a reduced communication power mode.

In step 606, emergency management system 260 may shut off selected communication components and/or GPS components (for example, GPS receiver 240) for the first predetermined period. In step 608, the emergency management system 260 checks to see if the first predetermined period has passed. If not, the system waits at step 610. Otherwise, the system moves to step 612 to turn on selected communication components and/or GPS components for the second predetermined period.

In step 614, one or more systems of the mobile device can receive data. In some cases, this can include location data. In some cases, systems of the mobile device may only be authorized to receive critical data. This could include text message data or data from other communication channels where information related to the emergency may be communicated, such as on social media.

In step 616, one or more systems of the mobile device could send any emergency communications or other critical information. For example, the location of the mobile device could be transmitted to a third party in cases where responders are trying to reach the user.

In step 618, emergency management system 260 checks to see if any instructions have been received to end the reduced communication mode. If not, the system returns back to step 606 to shut off selected communication components for the first predetermined period. This cycle may continue until the reduced communication mode is deactivated at step 620.

Although the exemplary embodiment depicts regular periods of disabled communication and regular periods of enabled communication, in other embodiments these periods may not be regular. For example, in another embodiment the periods could increase or decrease in duration in a systematic way. In another embodiment, the periods could be randomly selected within a suitable range.

Figure 8:
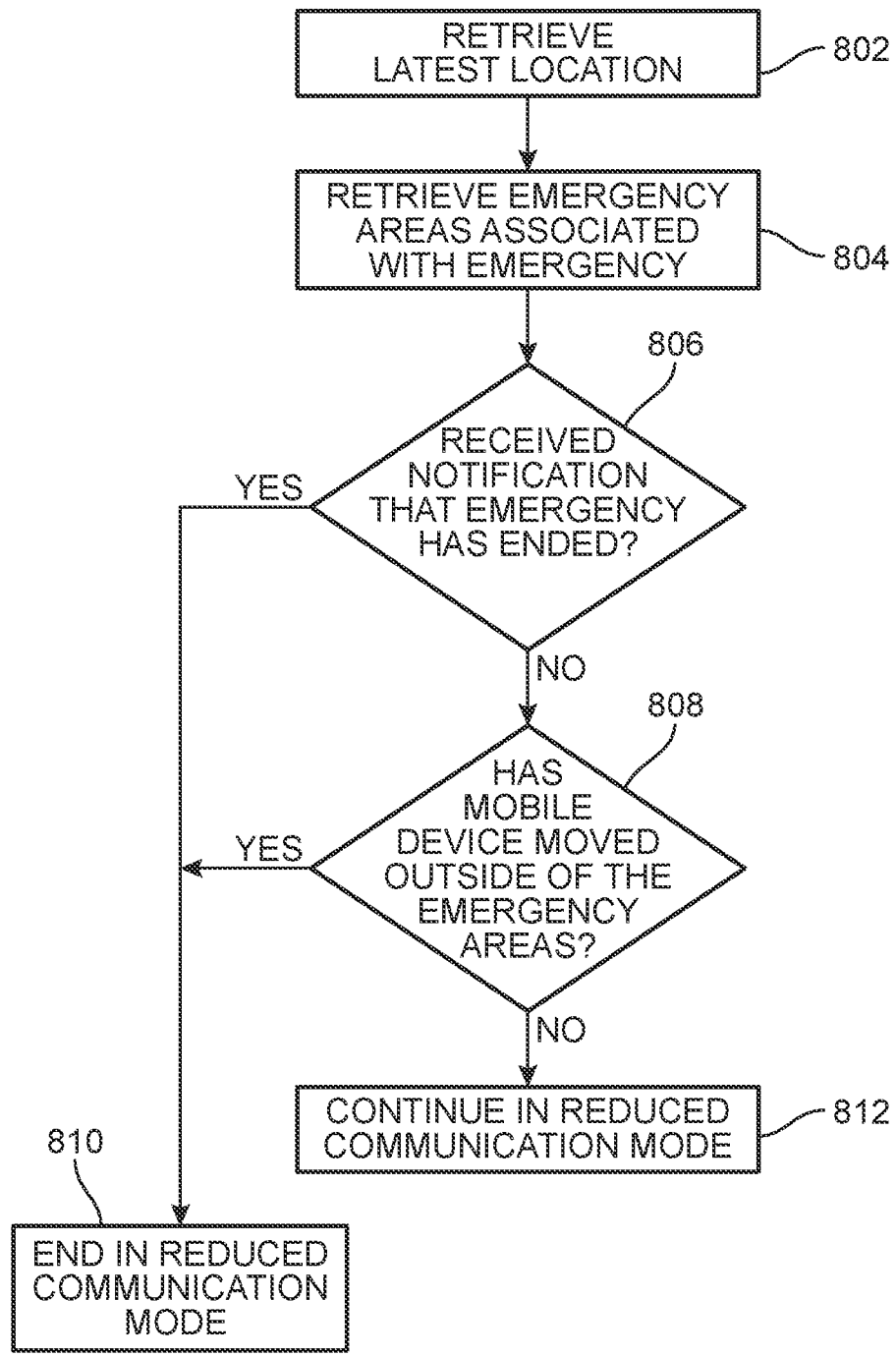
FIG. 8 is a schematic view of a process for ending a power saving mode.

FIG. 8 depicts an exemplary process for ending a reduced communication mode, according to an embodiment. In a first step 802, the emergency management system may retrieve the latest location of the mobile device. Next, in step 804, the emergency management system may retrieve the emergency areas associated with the emergency.

In step 806, the emergency management system checks for any notifications or messages indicating the emergency has ended. If the emergency has ended, the system proceeds to step 810 to end the reduced communication mode. Otherwise, the system proceeds to step 808. In step 808, the system checks to see if the mobile device has moved outside of the emergency areas (using location information determined in step 802 and emergency area information determined in step 804). If the mobile device has moved outside of the emergency areas, the system proceeds to step 810 to end the reduced communication mode. Otherwise the system proceeds to step 812 to continue in the reduced communication mode. In some cases, the process depicted in FIG. 8 can be repeated each time the system receives communication updates (that is, during the period when communication is enabled). This may repeat until the reduced communication mode ends.

Some embodiments may allow users to manually deactivate the reduced communication mode. This may be useful when an emergency occurs in a geographic area but does not hinder the user's ability to charge the mobile device.

Although the process depicted in FIG. 8 is directed to a method of ending a reduced communication mode, a similar method could be used to automatically end other power saving modes. For example, similar processes can be used to determine when to end a simplified display mode and/or a lower power application mode.

To reduce power consumption in a mobile device, some embodiments may include features to save power that would otherwise be consumed by a display of a mobile device. In some embodiments, the background color of a display could be changed from white (or any other color) to black. Some display technologies display black by not illuminating a pixel, such as organic light-emitted diode (OLED) based displays. For such displays, using a black background with white (or light) text could reduce power consumption by the display. In some embodiments, displaying only text may also save power. This is because content such as images, video and audio may have larger file sizes and may require more time (and thus energy) to download and/or load for display. Furthermore, processing large video/image and/or audio files may also consume more energy than processing only text data.

Figure 9:
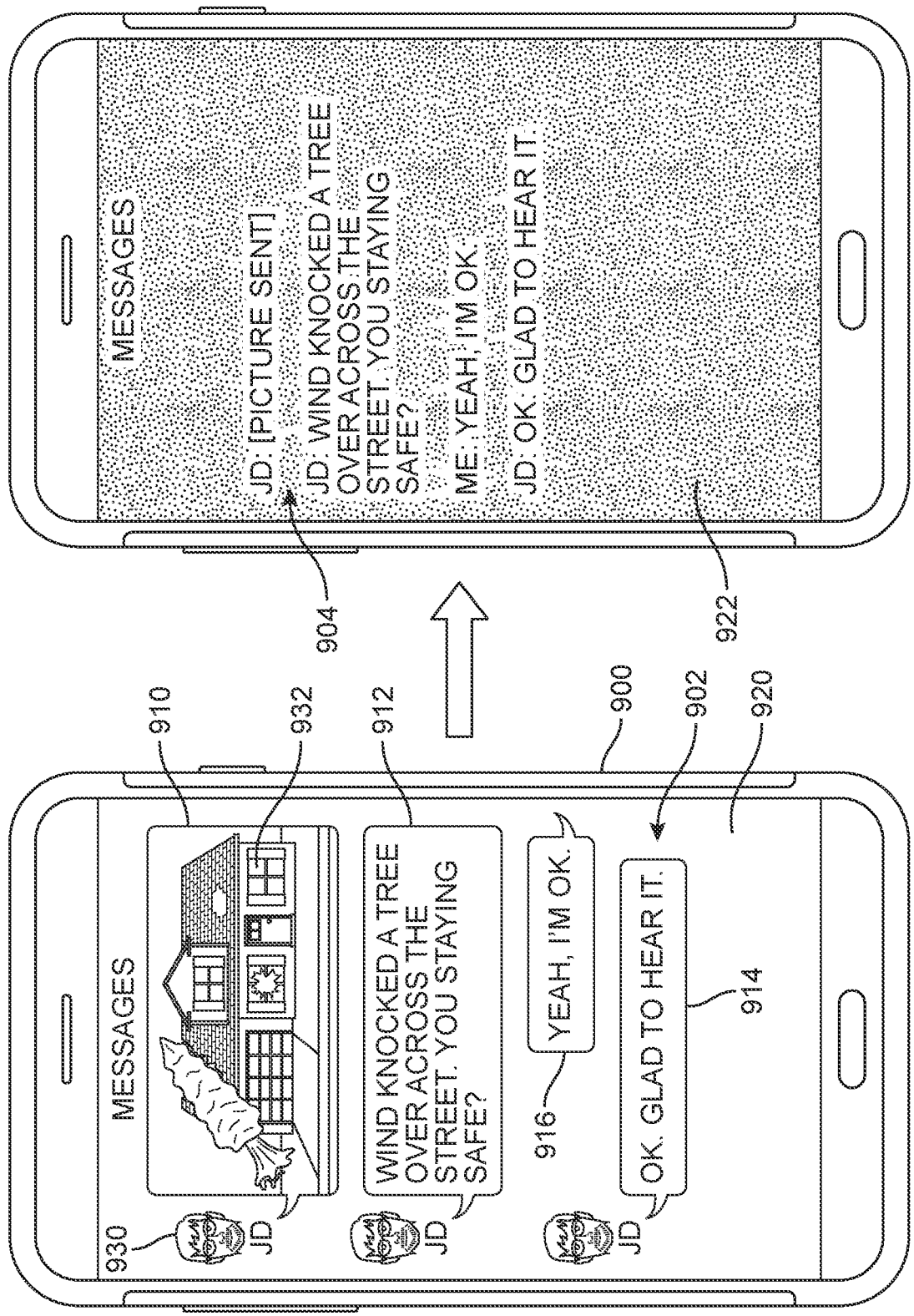
FIG. 9 is a schematic view of a normal display mode and a simplified display mode for a mobile device, according to an embodiment.

FIG. 9 depicts a schematic view of how the display of a mobile device 900 may change as a simplified display mode is enabled. The first configuration 902 shows mobile device 900 with the simplified display mode disabled. This is the default display mode of the mobile device. In this case, a user of mobile device 900 is messaging with a friend ("JD") about current conditions during a hurricane. The exchange includes first message 910, second message 912 and third message 914 from the friend. The exchange also includes response 916 from the user of mobile device 900.

The second configuration 904 shows how the exchange may be displayed in the simplified display mode. In the simplified display mode, the presentation has been drastically simplified in a manner to help reduce power consumption by the display 901 and/or related components used to generate displayed information. For example, the background color of the screen has been changed from a white color 920 to a black color 922 to save power. Additionally, avatar image 930 has been removed and replaced with a simple handle ("JD"). Content image 932 associated with first message 910 has also been removed and replaced with a notice that a picture has been sent and may presumably be retrieved when the simplified display mode is disabled.

Figure 10:
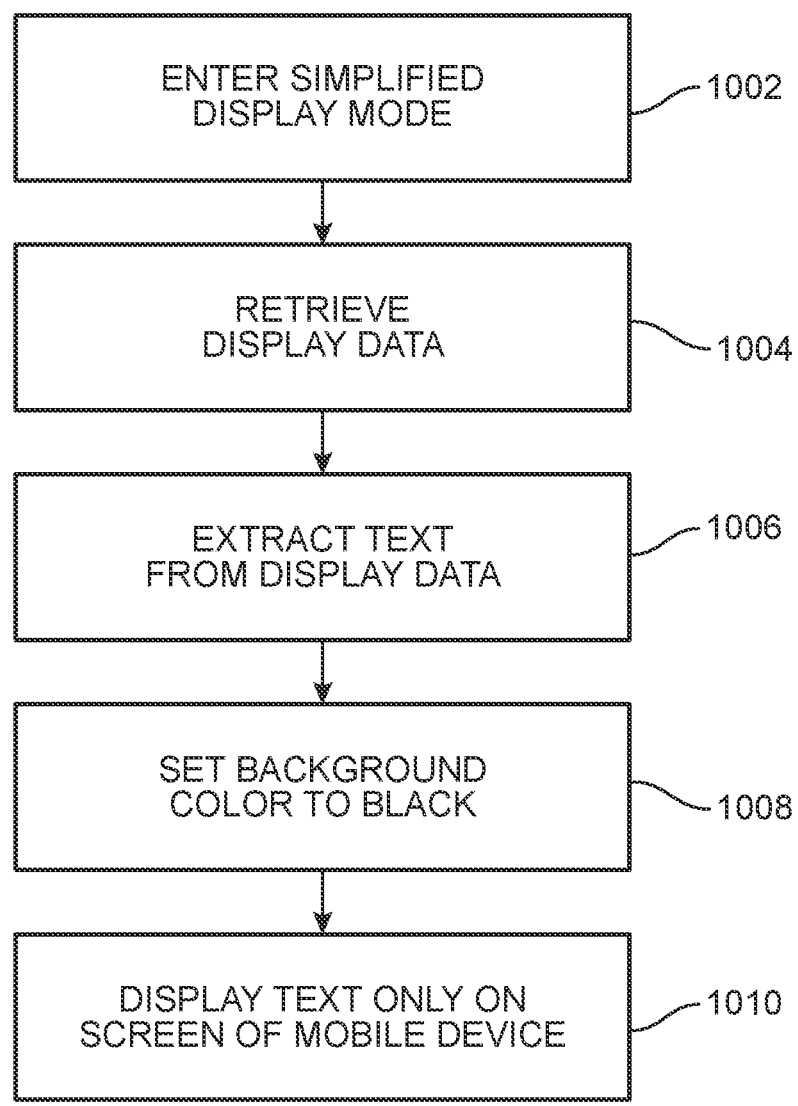
FIG. 10 is a schematic view of a process for operating a mobile device in a simplified display mode.

FIG. 10 is a schematic view of a process for operating a mobile device in a simplified display mode. In a first step 1002, the emergency management system places the mobile device in a simplified display mode (after receiving alert as described above). This hands control of one or more components and/or applications to a simplified display module (for example, simplified display module 406 of FIG. 4).

Next, in step 1004, the simplified display module may retrieve display data. As used herein, the term "display data" refers to data that an application, including possibly the operating system itself, needs to display. The display data can include content, such as text and other kinds of media, as well as header information, formatting information and other kinds of meta-data. In the context of a browser, for example, the display data may include any html code, cascading style sheets code, javascript code, as well as images, videos and/or audio files to be displayed by a webpage.

In step 1006, the simplified display module may extract text from the display data. For example, in the context of display data for a browser, the simplified display mode could extract the text based content of any html elements. As one example, the simplified display module could extract text from any "<div>", "<p>", and "<span>" html elements.

In step 1008, the simplified display module may set the background color for the display to black to minimize the number of illuminated pixels in the display. And in step 1010, the simplified display module may display text only (that is, the text extracted during step 1006) on the display (screen) of the mobile device.

In some embodiments, in addition to extracted text from display data, a simplified display module could also pre-emptively block systems and processes on the mobile device from downloading large media files. Blocking the downloading of such content could also help save power by reducing the overall transmission/reception times.

In some embodiments, a simplified display module may operate within the context of a single application. Thus, for example, a simplified display module may operate as part of a particular messaging application. As another example, a simplified display module could operate as part of a browser for a mobile device. In other embodiments, a simplified display module could be responsible for controlling two or more software applications. In still other embodiments, a simplified display module could operate within the broader context of the operating system, and therefore processes for extracting textual data could be applied at the systems level and used for displaying messages and other information across a wide variety of software applications running on the mobile device.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of managing the power consumption of a mobile device in an emergency, the method comprising the steps of:
   receiving, at the mobile device, an emergency alert message from a wireless emergency alert system, the emergency alert message including information about an ongoing emergency in a designated emergency area, wherein the designated emergency area corresponds to a geographic area;
   retrieving location information corresponding to a geographic location of the mobile device;
   determining if the geographic location of the mobile device is in the designated emergency area received with the emergency alert message;
   automatically enabling an emergency power saving mode in response to receiving the emergency alert message when the mobile device is geographically located in the designated emergency area;
   receiving another message from the wireless emergency alert system indicating that the emergency has ended; and
   disabling the emergency power saving mode in response to receiving the another message.

2. The method according to claim 1, wherein the emergency power saving mode can change from being disabled to being enabled while the location of the mobile device remains within the geographic area.

3. The method according to claim 1, wherein enabling the emergency power saving mode corresponds to operating the mobile device in a reduced communication mode.

4. The method according to claim 1, wherein the geographic area corresponds to a county in a state.

5. The method according to claim 1, wherein the ongoing emergency is a natural disaster, and wherein the geographic area corresponds to an area affected by the natural disaster.

6. The method according to claim 1, wherein the emergency alert message is received at the mobile device without any intervention by the user.

7. The method according to claim 1, wherein the method further comprises:
   receiving new location information for the mobile device; and
   disabling the emergency power savings mode when the new location information corresponds to a new location outside of the designated emergency area.

8. The method according to claim 1, wherein the emergency alert message is a text message.

9. A method of managing the power consumption of a mobile device in an emergency, wherein the mobile device includes a communication component, the method comprising the steps of:
   receiving, at the mobile device, an emergency alert message including information about an ongoing emergency in a designated emergency area, wherein the designated emergency area corresponds to a geographic area;
   retrieving location information corresponding to a geographic location of the mobile device;
   determining if the geographic location of the mobile device is in the designated emergency area received with the emergency alert message;
   enabling a reduced communication mode, in which the communication component is turned on and off, to save power in response to receiving the emergency alert message while the geographic location of the mobile device is in the designated emergency area;
   receiving another message from the wireless emergency alert system indicating that the emergency has ended; and
   disabling the reduced communication mode in response to receiving the another message.

10. The method according to claim 9, wherein emergency alert message is sent by a wireless emergency alert system.

11. The method according to claim 9, wherein the emergency alert message is a text message.

12. The method according to claim 9, wherein the communication component is a cellular network communication component.

13. The method according to claim 9, wherein the ongoing emergency is a natural disaster, and wherein the geographic area corresponds to an area affected by the natural disaster.

14. The method according to claim 9, wherein the geographic area corresponds to a county in a state.

15. The method according to claim 9, wherein the method further comprises: operating the mobile device in a simplified display mode while the location of the mobile device is in the designated emergency area.

16. The method according to claim 9, wherein the method further includes transmitting data while the communication component is turned on.

17. The method according to claim 9, wherein the mobile device is a cell phone.

18. A method of managing the power consumption of a mobile device in an emergency, the mobile device including a display, the method comprising the steps of:
   receiving, at the mobile device, an emergency alert message from a wireless emergency alert system including information about an ongoing emergency in a designated emergency area, wherein the designated emergency area corresponds to a geographic area;
   retrieving location information corresponding to a geographic location of the mobile device;
   determining if the geographic location of the mobile device is in the designated emergency area received with the emergency alert message;
   enabling a simplified display mode in response to receiving the emergency alert message when the mobile device is in the designated emergency area, wherein operating in the simplified display mode further comprises:
retrieving display data;
extracting text from the display data;
displaying a black background on the display; and
displaying the extracted text over the black background on the display;
receiving another message from the wireless emergency alert system indicating that the emergency has ended; and
disabling the simplified display mode in response to receiving the another message.

19. The method according to claim 18, wherein the display data includes text and at least one image, and wherein the image is not displayed.

20. The method according to claim 18, wherein the display data includes text and at least one video, and wherein the video is not displayed.

* * * * *